United States Patent Office 3,068,302
Patented Dec. 11, 1962

3,068,302
DISPROPORTIONATION OF TOLUENE
Alan Schriesheim, Berkeley Heights, N.J., assignor to Esso Research and Engineering Company, a corporation of Delaware
No Drawing. Filed Dec. 30, 1959, Ser. No. 862,784
4 Claims. (Cl. 260—672)

This invention relates to the disproportionation of toluene in the presence of an aluminum bromide and hydrogen bromide containing catalyst. In particular this invention relates to an improved process for converting toluene to benzene and a methyl substituted benzene containing at least two methyl groups per molecule.

The disproportionation of alkyl aromatics including toluene in the presence of a Friedel-Crafts metal halide catalyst is known to the art. However, the known processes have been characterized by an indiscriminate variety of hydrocarbon products and the isomers thereof, the formation of undesirable high molecular weight compounds, the necessity for employing other reactants in admixture with toluene, catalyst fouling and sludge formation.

It is one object of the present invention to provide a process for the disproportionation of toluene without sludge formation.

Another object of this invention is to provide a process for converting toluene to xylene and benzene without forming higher molecular weight compounds.

Still another object of this invention is to provide a process for converting toluene to benzene and meta xylene in substantially equimolar proportions.

It has now been discovered that toluene may be converted to benzene and xylene without requiring the presence of another hydrocarbon reactant and without the formation of significant quantities of sludge and/or higher molecular weight compounds, e.g. $C_{9+}$ alkyl aromatics, by contacting toluene with an aluminum bromide and hydrogen bromide containing catalyst at a temperature in the range of 100° to 300°, preferably 150° to 250°, F.

If certain critical conditions are maintained in carrying out this reaction the reaction products formed will consist essentially of benzene and meta xylene in about equal proportions.

To eliminate the formation of undesirable higher molecular weight products it is necessary to limit conversion of the toluene feedstock to below about 50%, e.g. 5 to 50 wt. percent. This may be controlled by conventional means such as lowering the temperature, quenching with water, by removing the HBr under vacuum and distilling the product from the $AlBr_3$, etc.

The composition of the catalyst and the amounts employed are also critical. Thus, the mole ratio of $AlBr_3$ to toluene in the reaction zone should not fall below about ⅓ mole $AlBr_3$ per mole of toluene. The amount of $AlBr_3$ may range upward from this ratio to a ratio of about 1 to 1 or to the limits of $AlBr_3$ solubility in a single phase reaction mixture of toluene, HBr and $AlBr_3$. The mole ratio of HBr to toluene should not fall below about 1 mole of HBr per 6 moles of toluene. This amount may range upwardly to a mole ratio of HBr to toluene of about 1 to 3 or to the limits of HBr solubility in a three component single phase reaction mixture of toluene, $AlBr_3$ and HBr. It is preferred to employ about ⅓ to ⅔ mole of $AlBr_3$ and ⅙ to ⅓ mole of HBr per mole of toluene.

It is necessary to maintain the toluene and catalyst in a single essentially homogeneous phase during the reaction if the xylene product is to be recovered consisting essentially of the meta isomer. By operating within the catalyst concentrations hereinafter set forth a reaction mixture of single phase is effected.

The time of contact with the catalyst is critical only in the sense of limiting the degree of conversion to below about 50%. The optimum time for a given application will vary according to the temperature employed, the toluene to catalyst ratio, and the degree of conversion desired. In batch operation, a time of contact of about ¼ to 2, preferably ½ to 1½, hours gives good results. The mixture of benzene, toluene and xylene recovered as product from the reaction may be separated by conventional means such as by distillation and the unconverted toluene recycled to the reaction zone.

The invention may be more easily understood from the following example, the details of which are not to be construed as limiting the true scope of the invention as set forth in the specification and claims.

*Example 1*

Into a 1 liter, 3 necked, glass flask equipped with a stirrer, condenser and self-sealing neoprene diaphragm are placed 179.3 grams of toluene. About 300 grams of $AlBr_3$ are added to the toluene and HBr is bubbled through the mixture until about 42.6 grams are absorbed, i.e. until absorption of HBr no longer occurs. The reaction mixture is then heated to about 177° F. and maintained at that temperature at atmospheric pressure. No HBr is evolved. The single phase mixture is sampled and analyzed at periodic intervals. The composition of the organic material in the reaction mixture is found to be as follows:

| Time, Minutes | 30 | 60 | 90 | 145 |
|---|---|---|---|---|
| Analysis of Product, Wt. Percent: | | | | |
| Benzene | 4.2 | 16.2 | 22.3 | 26.5 |
| Toluene | 91.4 | 65.9 | 53.2 | 41.3 |
| Ethyl-benzene | 0.0 | 0.0 | 0.0 | 0.0 |
| Ortho-xylene | 0.0 | 0.0 | 0.0 | 0.3 |
| Para-xylene | 0.2 | 0.0 | 0.0 | 0.3 |
| Meta-xylene | 4.2 | 17.9 | 24.5 | 27.2 |
| Mesitylene | 0.0 | 0.0 | 0.0 | 0.4 |
| $C_{9+}$ | 0.0 | 0.0 | 0.0 | 4.1 |

The procedure of run 1 is repeated employing 180.2 grams of toluene, 301.4 grams of $AlBr_3$ and 39.5 grams of HBr. The reaction is carried out at 244.4° F. at atmospheric pressure.

Analysis of the single phase reaction mixture at the end of 30 minutes reveals the following composition of organic material therein:

Analysis of product                          Wt. percent
- Benzene _____ 15.8
- Toluene _____ 67.4
- Ethylbenzene _____ 0.0
- Ortho-xylene _____ 0.0
- Para-xylene _____ 0.2
- Meta-xylene _____ 16.6
- Mesitylene _____ 0.0
- $C_{9+}$ _____ 0.0

The procedure of run 1 is repeated employing 178 grams of toluene, 49 grams of $AlBr_3$, and 13 grams of HBr. The reaction mixture separates into an upper and lower layer. The temperature is maintained at about 244° F. The reaction mixture is analyzed at regular intervals separate samples being taken from both the upper and lower layers and the composition of the organic material therein determined to be as follows:

| Time, Minutes | 30 | 65 | 95 |
|---|---|---|---|
| Analysis of Product, Wt. percent: | | | |
| Lower Layer— | | | |
| Benzene | 2.0 | 8.3 | 10.3 |
| Toluene | 93.2 | 71.7 | 67.0 |
| Ethylbenzene | 2.2 | 1.4 | 1.7 |
| Ortho-xylene | 0.0 | 0.8 | 1.3 |
| Para-xylene | 0.1 | 0.7 | 0.8 |
| Meta-xylene | 2.5 | 7.1 | 4.7 |
| Mesitylene | 0.0 | 1.8 | 3.5 |
| $C_9+$ | 0.0 | 8.3 | 10.8 |
| Upper Layer— | | | |
| Benzene | 0.7 | 9.7 | 12.2 |
| Toluene | 92.7 | 83.2 | 76.3 |
| Ethyl Benzene | 5.8 | 2.8 | 4.5 |
| Ortho-xylene | 0.0 | 0.8 | 1.4 |
| Para-xylene | 0.0 | 0.5 | 1.4 |
| Meta-xylene | 0.8 | 3.0 | 4.2 |
| Mesitylene | 0.0 | 0.0 | 0.0 |
| $C_9+$ | 0.0 | 0.0 | 0.0 |

The procedure of run 3 is repeated using 188 grams of toluene, 123.5 grams of $AlBr_3$ and 23.7 grams of HBr. Analysis of the upper and lower layers after 57 minutes reveals the organic composition of such layers to be as follows:

| Analysis of Product, Wt. Percent | Lower Layer | Upper Layer |
|---|---|---|
| Benzene | 15.4 | 17.2 |
| Toluene | 66.7 | 74.8 |
| Ethyl Benzene | 5.4 | 0.0 |
| Ortho-xylene | 1.1 | 1.5 |
| Para-xylene | 1.4 | 1.9 |
| Meta-xylene | 10.1 | 4.6 |
| Mesitylene | 2.3 | 0.0 |
| $C_9+$ | 7.6 | 0.0 |

The procedure of run 2 is repeated employing 179.1 grams of toluene, 217.9 grams of $AlBr_3$ and 4.2 grams of $BF_3$. Analysis of the single phase reaction mixture at 30 minute intervals reveals the organic composition of the reaction mixture to be as follows:

| Time, Minutes | 30 | 60 | 90 |
|---|---|---|---|
| Analysis of Product, Wt. Percent: | | | |
| Benzene | 12.7 | 16.2 | 15.1 |
| Toluene | 68.2 | 52.1 | 40.5 |
| Ethylbenzene | 0.0 | 0.0 | 2.3 |
| Ortho-xylene | 1.4 | 1.2 | 1.6 |
| Para-xylene | 0.5 | 0.7 | 1.1 |
| Meta-xylene | 4.2 | 2.5 | 3.3 |
| Mesitylene | 1.3 | 1.9 | 1.1 |
| $C_9+$ | 11.7 | 25.5 | 35.1 |

The procedure of run 2 is repeated employing 179.1 grams of toluene, 225.5 grams of $AlBr_3$ and 4.3 grams of $BBr_3$. The reaction is found to proceed very slowly. At the end of 150 minutes the organic material in the reaction mixture is analyzed and found to have the following composition:

| Analysis of product, | Wt. percent |
|---|---|
| Benzene | 10.7 |
| Ethylbenzene | 0.0 |
| Ortho-xylene | 2.1 |
| Para-xylene | 1.1 |
| Meta-xylene | 4.4 |
| Mesitylene | 0.0 |
| $C_9+$ | 0.0 |
| Toluene | 81.6 |

Another run is made employing 40 parts by weight of aluminum chloride, 100 parts by weight of toluene and excess $H_2$ under a pressure of 500 p.s.i.g. The temperature is maintained at 212° F. and the reaction mixture is agitated for 1 hour. The reaction mixture is cooled and the hydrocarbons separated from the catalyst. The hydrocarbons are then washed, dried, filtered, and the components separated by distillation. There are recovered 59 parts by weight of toluene. The remainder of the organic material is analyzed and found to consist of 11.1 vol. percent of a cyclopentane and methyl cyclopentane mixture, 7.6 vol. percent methyl cyclohexane, 11.1 vol. percent benzene, 22.2 vol. percent of a mixture of xylene isomers, and 48 vol. percent of higher boiling hydrocarbons.

Another run is made employing a naphthalene in the reaction zone. About 3 moles (426 grams) of alpha-methyl naphthalene is charged to a rotating pressure autoclave and cooled to approximately 0° C. as 1 mole (92 grams) of toluene containing approximately 19 grams of aluminum chloride dissolved therein is added to the naphthalene. The autoclave is sealed, charged with 3 grams of anhydrous hydrogen chloride and nitrogen to a pressure of 150 pounds per square inch and thereafter is heated to a temperature of 70° C. while the contents of the autoclave are stirred by rotating the apparatus. The reaction is continued for about 1 hour, following which the autoclave is cooled to 0° C., the pressure released, and the contents are poured into one liter of water. The upper hydrocarbon phase is separated from the aqueous phase, dried over calcium chloride and distilled at atmospheric pressure. 21 grams of a fraction boiling between 75–100° C. are separated as the initial boiling fraction and found to contain 70% benzene representing a yield of benzene from the reaction of approximately 5 mole percent.

What is claimed is:

1. A process for converting toluene to benzene and xylene which comprises contacting a toluene-comprising hydrocarbons feed wherein toluene is the sole reacting hydrocarbon with ⅓ to ⅔ mole of $AlBr_3$ and ⅙ to ⅓ mole of HBr per mole of said toluene at a temperature in the range of 150° F. to 250° F. until a maximum of about 50 wt. percent of said toluene is converted whereby benzene and xylene are produced substantially without the concomitant production of other hydrocarbons and sludge and recovering said benzene and said xylene in substantially equimolar amounts from the resulting reaction mixture.

2. A process in accordance with claim 1 wherein said xylene is meta-xylene.

3. A process in accordance with claim 1 wherein the mole ratio of said $AlBr_3$ to toluene is about 1 to 2 and the mole ratio of said HBr to toluene is about 1 to 4.

4. A process for preparing benzene and xylene in substantially equimolar amounts which comprises admixing a toluene comprising reactant wherein toluene is the sole reacting hydrocarbon and aluminum bromide in a mole ratio of about 1:3 to 2:3 at a temperature in the range of about 150° to 250° F., introducing hydrogen bromide gas into the resulting mixture until said hydrogen bromide gas is no longer absorbed by such mixture, maintaining the resulting reaction mixture at a temperature in said range until 5 to 50 wt. percent of said toluene has been converted to benzene and xylene in the substantial absence of concomitant formation of other hydrocarbons and sludge and separating said benzene and said xylene in substantially equimolar amounts from said reaction mixture.

References Cited in the file of this patent

UNITED STATES PATENTS

| | | |
|---|---|---|
| 2,418,689 | Benedict et al. | Apr. 8, 1947 |
| 2,739,991 | Hervert | Mar. 27, 1956 |
| 3,006,977 | McCaulay | Oct. 31, 1961 |
| 3,009,004 | Levy et al. | Nov. 14, 1961 |